(12) United States Patent
Taheri et al.

(10) Patent No.: US 7,826,998 B1
(45) Date of Patent: Nov. 2, 2010

(54) SYSTEM AND METHOD FOR MEASURING THE TEMPERATURE OF A DEVICE

(75) Inventors: Babak Taheri, San Francisco, CA (US); Gopal Patil, Sunnyvale, CA (US); Sanjeev Maheshwari, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 11/274,645

(22) Filed: Nov. 15, 2005

Related U.S. Application Data

(60) Provisional application No. 60/629,419, filed on Nov. 19, 2004.

(51) Int. Cl.
*G01K 7/00* (2006.01)

(52) U.S. Cl. ..................................................... 702/130

(58) Field of Classification Search ................. 702/130, 702/132, 64, 65, 58, 99, 117, 183, 184; 327/513, 327/538; 374/100, 114, 163, 178; 324/500, 324/522, 537; 714/25, 44, 48; 700/299
See application file for complete search history.

(56) References Cited

U.S. PATENT DOCUMENTS

| | | | |
|---|---|---|---|
| 3,781,648 A | 12/1973 | Owens | |
| 4,450,367 A | 5/1984 | Whatley | |
| 4,849,684 A | 7/1989 | Sonntag et al. | |
| 4,935,690 A | 6/1990 | Yan | |
| 5,049,806 A | 9/1991 | Urakawa et al. | |
| 5,233,161 A * | 8/1993 | Farwell et al. | 219/209 |
| 5,406,212 A * | 4/1995 | Hashinaga et al. | 324/760 |
| 5,451,860 A | 9/1995 | Khayat | |
| 5,559,425 A | 9/1996 | Allman | |
| 6,149,299 A * | 11/2000 | Aslan et al. | 374/178 |
| 6,181,121 B1 * | 1/2001 | Kirkland et al. | 323/313 |
| 6,870,357 B1 * | 3/2005 | Falik | 324/71.5 |
| 7,042,689 B2 * | 5/2006 | Chen | 361/56 |
| 7,089,146 B1 * | 8/2006 | D'Aquino et al. | 702/132 |
| 7,097,354 B2 * | 8/2006 | Miteva et al. | 374/159 |
| 7,102,417 B2 * | 9/2006 | Gordon et al. | 327/512 |
| 7,276,957 B2 * | 10/2007 | Bhattacharya et al. | 327/534 |
| 2006/0063285 A1 * | 3/2006 | Miller | 438/17 |

FOREIGN PATENT DOCUMENTS

JP    03-154832    *    7/1991

OTHER PUBLICATIONS

Current Source, Wikipedia, pp. 1-6, modified Oct. 26, 2007.*
USPTO Notice of Allowance for U.S. Appl. No. 09/262,430 dated Sep. 11, 2000; 2 pages.
USPTO Final Rejection for U.S. Appl. No. 09/262,430 dated Jun. 21, 2000; 9 pages.
USPTO Non-Final Rejection for U.S. Appl. No. 09/262,430 dated Feb. 4, 2000; 6 pages.

* cited by examiner

*Primary Examiner*—Michael P Nghiem

(57) ABSTRACT

A method of measuring the temperature of device under test includes the steps of injecting a first current into an on-chip diode wherein a die containing the on-chip diode is under test. A second current is injected into the on-chip diode. A junction temperature is calculated based on the first current and the second current.

18 Claims, 3 Drawing Sheets

SYSTEM AND METHOD FOR MEASURING THE TEMPERATURE OF A DEVICE

RELATED APPLICATIONS

The present invention claims priority on provisional patent application Ser. No. 60/629,419, filed on Nov. 19, 2004, entitled "Method of Measuring and Setting the Temperature of the Die in LFR Conditions".

FIELD OF THE INVENTION

The present invention relates generally to the field of semiconductor devices and more particularly to a system and method for measuring the temperature of a device(s).

BACKGROUND OF THE INVENTION

The latent failure rate (LFR) test is a reliability qualification test widely used during semiconductor device manufacturing. It is a measure of life cycle of the semiconductor devices. In conventional manufacturing processes, the LFR is typically measured by operating the devices at elevated temperature and voltage for 1000 hours and measuring the failure rate. Using the Arrhenius law, the expected failure rate at operating temperature is calculated.

In the conventional solution the LFR burn-in temperature is estimated and is not actually measured in line. The conventional method of setting LFR burn-in temperature is described. In a first step, the average or maximum power of the device is estimated. In a second step, the junction temperature is computed using the temperature coefficient of the package (θja) which is typically provided by the packaging manufacturers and the ambient temperature as described below:

$$Tj = Power \ast \theta ja + Tambient$$

The LFR burn-in temperature estimated using the formula above is approximate and can be inaccurate by several tens of degrees. Because of this approximation error in setting the burn-in temperature, in some cases the actual junction temperature can be higher than process allows which can lead to "inter-metallic" growth on the pad, also known as "Purple Plague Failure". Purple plague failure is an undesirable failure mechanism well known in semiconductor manufacturing. Alternately because of an approximation error, the actual junction temperature may be lower in which case there is danger of under-stressing the parts, leading to weak or unreliable devices being shipped to customers, which is highly undesirable.

It would be desirable to have an accurate and in-line measurement of the LFR burn-in temperature.

SUMMARY OF INVENTION

A method of measuring the temperature of a device that overcomes these and other problems includes the steps of injecting a first current into a on-chip diode. A second current is injected into the on-chip diode. A junction temperature is calculated based on the first current and the second current. An electro-static discharge diode may be selected as the on-chip diode or a parasitic diode may be selected. An ambient temperature may be adjusted based on the junction temperature. The first current may be injected through a first resistor. The second current may be injected through a second resistor. A resistance of the first resistor may not be equal to a resistance of the second resistor.

In one embodiment, a method of measuring the temperature of a device includes the steps of injecting a first current into a first diode. A second current is injected into a second diode. A device temperature is calculated using the first current and the second current. The first current may be set higher than the second current. The first current may pass through a first resistor. The second current may pass through a second resistor. A resistance of the second resistor may be greater than a resistance of the first resistor. An ambient temperature may be controlled based on the device temperature. An electro-static discharge diode may be selected as the first diode. A parasitic diode may be selected as the second diode.

In one embodiment, a system for measuring a temperature of a device includes a current source. An on-chip diode is coupled to the current source. A voltage measuring circuit is coupled to the on-chip diode. A resistor may be coupled between the current source and the on-chip diode. The current source may include a high current source and a low current source. The on-chip diode may be an electro-static discharge diode or a parasitic diode.

DETAILED DESCRIPTION OF THE DRAWINGS

The present invention is directed to accurately measuring the temperature of an integrated circuit. In particular, when the integrated circuit is under test for its Latent Failure Rate (LFR). However, the invention is not limited to this application. The invention uses the relationship between the voltage drop across a diode as a function of temperature and does not require any special diodes be placed on the integrated circuit.

Figure 1:
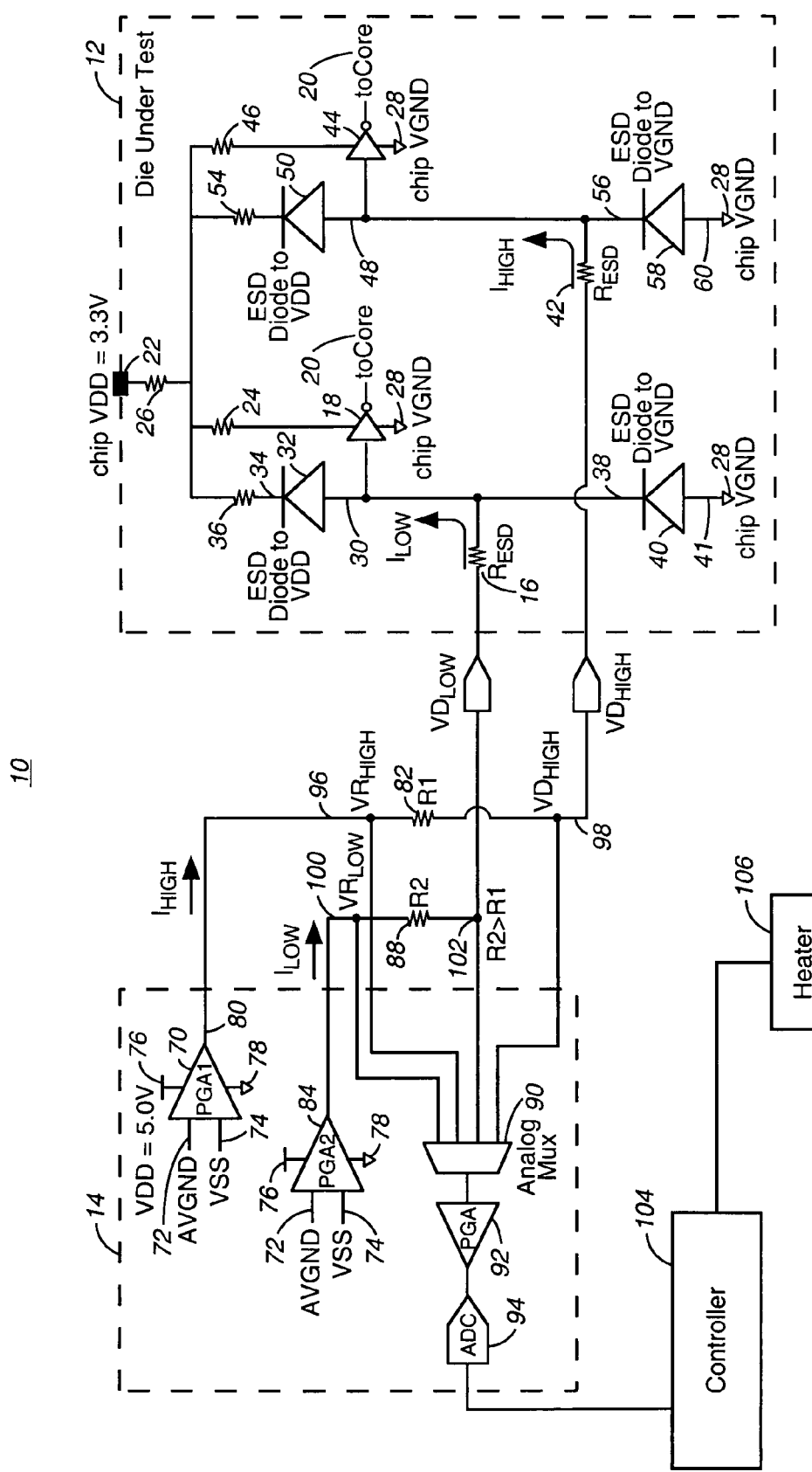
FIG. 1 is a block diagram of a system for measuring the temperature of a device in accordance with one embodiment of the invention.

FIG. 1 is a block diagram of a system 10 for measuring the temperature of a device in accordance with one embodiment of the invention. The system contains two main components, the die under test 12 and the test circuitry 14. The test circuitry 14 may be part of the integrated circuit or die under test or it may be external to the integrated circuit. The die under test 12 has a first electro-static discharge (ESD) resistor 16. Other diodes including substrate diodes and parasitic IO diodes can also be utilized as well. The resistor 16 is coupled to a buffer circuit 18. The buffer circuit 18 is coupled to the core 20 of the die under test 12. The buffer circuit 18 is coupled to the power supply 22 through a pair of resistors 24, 26. The buffer circuit 18 is also coupled to ground (Chip ground) 28. The resistor 16 is also coupled to the anode 30 of an electro-static discharge diode 32. The cathode 34 of the electro-static discharge diode 32 is coupled to a resistor 36 that is coupled to the power supply 22. The resistor 16 is coupled to a cathode 38 of a second electro-static discharge diode 40. The anode 41 of the electro-static discharge diode 40 is coupled to ground 28.

The die under test 12 has a second electro-static discharge (ESD) resistor 42. The resistor 42 is coupled to a buffer circuit 44. The buffer circuit 44 is coupled to the core 20 of the die under test 12. The buffer circuit 44 is coupled to the power supply 22 through a pair of resistors 46, 26. The buffer circuit 44 is also coupled to ground (Chip ground) 28. The resistor 42 is also coupled to the anode 48 of an electro-static discharge diode 50. The cathode 52 of the electro-static discharge diode 50 is coupled to a resistor 54 that is coupled to the power supply 22. The resistor 42 is coupled to a cathode 56 of a second electro-static discharge diode 58. The anode 60 of the electro-static discharge diode 58 is coupled to ground 28. In one embodiment the diodes are parasitic diodes.

The test circuit 14 has a first programmable gain amplifier (PGA1) 70 that has a pair of inputs, analog ground (AVGND) 72 and a signal ground voltage VSS 74. The programmable gain amplifier 70 is coupled to a power supply (VDD) 76 and to ground 78. The output 80 is labeled $I_{HIGH}$ and is coupled through a first resistor (R1) 82 to the second electro-static discharge resistor 42.

The test circuit 14 has a second programmable gain amplifier (PGA2) 84 that has a pair of inputs, analog ground (AVGND) 72 and a signal ground voltage VSS 74. The programmable gain amplifier 84 is coupled to a power supply (VDD) 76 and to ground 78. The output 86 is labeled $I_{LOW}$ and is coupled through a second resistor (R2) 88 to the first electro-static discharge resistor 16.

The test circuit 14 has an analog multiplexer 90 coupled to a programmable amplifier 92. The amplifier 92 is coupled to an analog to digital converter (ADC) 94. The analog multiplexer 90 is coupled to the following voltage nodes: $VR_{HIGH}$ 96, $VD_{HIGH}$ 98, $VR_{LOW}$ 100 and $VD_{LOW}$ 102.

The output of the analog to digital converter (ADC) 94 is coupled to a controller 104. The controller 104 controls a heater 106 that controls the ambient temperature of the die under test.

In operation the test circuit 14 injects the high current $I_{HIGH}$ through the first resistor 82 and through the diode 32. The analog multiplexer 90 couples the node $VR_{HIGH}$ 96 to the analog to digital converter 94. The output of the analog to digital converter 94 is stored in the controller 104. Next the analog multiplexer 90 couples the node $VD_{HIGH}$ 98 to the analog to digital converter 94. The output of the analog to digital converter 94 is stored in the controller 104. The test circuit 14 injects the low current $I_{LOW}$ through the second resistor 88 and through the diode 50. Next the analog multiplexer 90 couples the node $VR_{LOW}$ 100 to the analog to digital converter 94. The output of the analog to digital converter 94 is stored in the controller 104. Next the analog multiplexer 90 couples the node $VD_{LOW}$ 102 to the analog to digital converter 94. The output of the analog to digital converter 94 is stored in the controller 104.

Once this information is gathered the controller computes the temperature of the die under test 12 using the equation:

$$Temp = \frac{q}{k} * (VD_{HIGH} - VD_{LOW}) * \frac{1}{\ln[(VR_{HIGH} - VD_{HIGH}) * R2/(VR_{LOW} - VD_{LOW}) * R1]}$$

Where, k—is Boltzmann's constant
q—is the constant charge on an electron

Once the temperature has been calculated, the controller 104 may adjust the heater so that the LFR (latent failure rate) test is accurate. The system and method may be used for other purpose where it is desirable to know the temperature of an integrated circuit.

Figure 2:
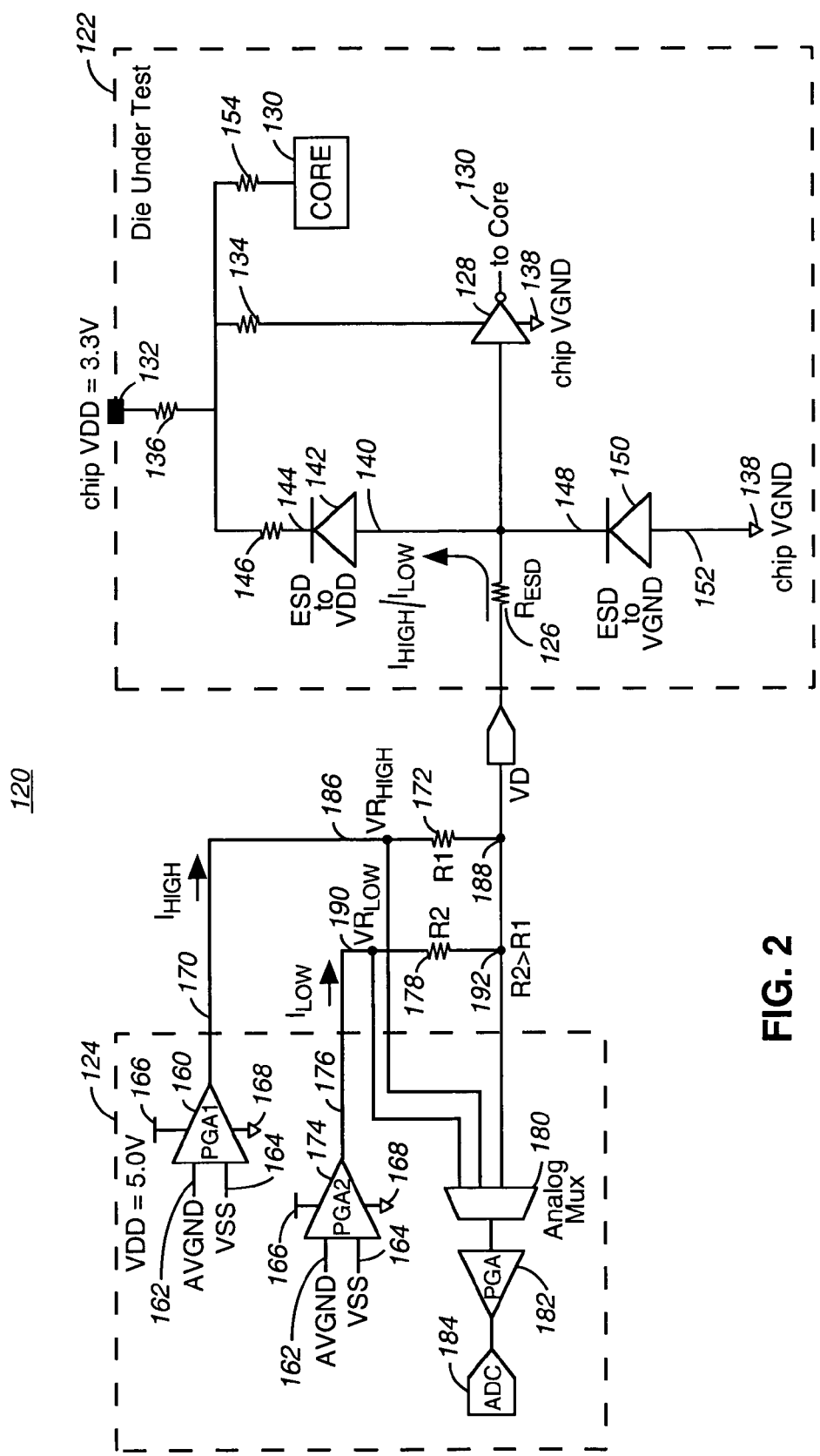
FIG. 2 is a block diagram of a system for measuring the temperature of a device in accordance with one embodiment of the invention.

FIG. 2 is a block diagram of a system 120 for measuring the temperature of a device in accordance with one embodiment of the invention. The system 120 contains two main components, the die under test 122 and the test circuitry 124. The test circuitry 124 may be part of the integrated circuit or die or it may be external to the integrated circuit. The die under test 122 has an electro-static discharge (ESD) resistor 126. The resistor 126 is coupled to a buffer circuit 128. The buffer circuit 128 is coupled to the core 130 of the die under test 122. The buffer circuit 128 is coupled to the power supply 132 through a pair of resistors 134, 136. The buffer circuit 128 is also coupled to ground (Chip ground) 138. The resistor 126 is also coupled to the anode 140 of an electro-static discharge diode 142. The cathode 144 of the electro-static discharge diode 142 is coupled to a resistor 146 that is coupled to the power supply 132. The resistor 126 is coupled to a cathode 148 of a second electro-static discharge diode 150. The anode 152 of the electro-static discharge diode 150 is coupled to ground 138. In one embodiment the diodes are parasitic diodes. The power supply voltage 132 is coupled through a pair of resistors 136, 154 to the core 130.

The test circuit 124 has a first programmable gain amplifier (PGA1) 160 that has a pair of inputs, analog ground (AVGND) 162 and a ground signal VSS 164. The programmable gain amplifier 160 is coupled to a power supply (VDD) 166 and to ground 168. The output 170 is labeled $I_{HIGH}$ and is coupled through a first resistor (R1) 172 to the electro-static discharge resistor 126.

The test circuit 124 has a second programmable gain amplifier (PGA2) 174 that has a pair of inputs, analog ground (AVGND) 162 and a ground signal voltage VSS 164. The programmable gain amplifier 174 is coupled to a power supply (VDD) 166 and to ground 168. The output 176 is labeled $I_{LOW}$ and is coupled through a second resistor (R2) 178 to the electro-static discharge resistor 126.

The test circuit 124 has an analog multiplexer 180 coupled to a programmable amplifier 182. The amplifier 182 is coupled to an analog to digital converter (ADC) 184. The analog multiplexer 180 is coupled to the following voltage nodes: $VR_{HIGH}$ 186, $VD_{HIGH}$ 188, $VR_{LOW}$ 190 and $VD_{LOW}$ 192.

The output of the analog to digital converter (ADC) 184 may coupled to a controller as shown in FIG. 1. The controller may control a heater that controls the ambient temperature of the die under test or may just have a temperature readout.

In operation, the test circuit 124 injects the high current $I_{HIGH}$ through the first resistor 172 and through the diode 142. The analog multiplexer 180 couples the node $VR_{HIGH}$ 186 to the analog to digital converter 184. The output of the analog to digital converter 184 may be stored in the controller. Next the analog multiplexer 180 couples the node $VD_{HIGH}$ 188 to the analog to digital converter 184. The output of the analog to digital converter 184 is stored in the controller. The test circuit 124 injects the low current $I_{LOW}$ through the second resistor 178 and through the diode 142 while turning off the high current $I_{HIGH}$. Next the analog multiplexer 180 couples the node $VR_{LOW}$ 190 to the analog to digital converter 184. The output of the analog to digital converter 184 is stored in the controller. Next the analog multiplexer 180 couples the node $VD_{LOW}$ 192 to the analog to digital converter 184. The output of the analog to digital converter 184 is stored in the controller.

Once this information is gathered the controller computes the temperature of the die under test 122 using the equation:

$$\text{Temp} = \frac{q}{k} * (VD_{HIGH} - VD_{LOW}) * \frac{1}{\ln[(VR_{HIGH} - VD_{HIGH}) * R2 / (VR_{LOW} - VD_{LOW}) * R1]}$$

Where, k—is Boltzmann's constant
q—is the electronic charge

Once the temperature has been calculated, the controller may adjust the heater so that the LFR (latent failure rate) test is accurate. The system and method may be used for other purpose where it is desirable to know the temperature of an integrated circuit.

Figure 3:
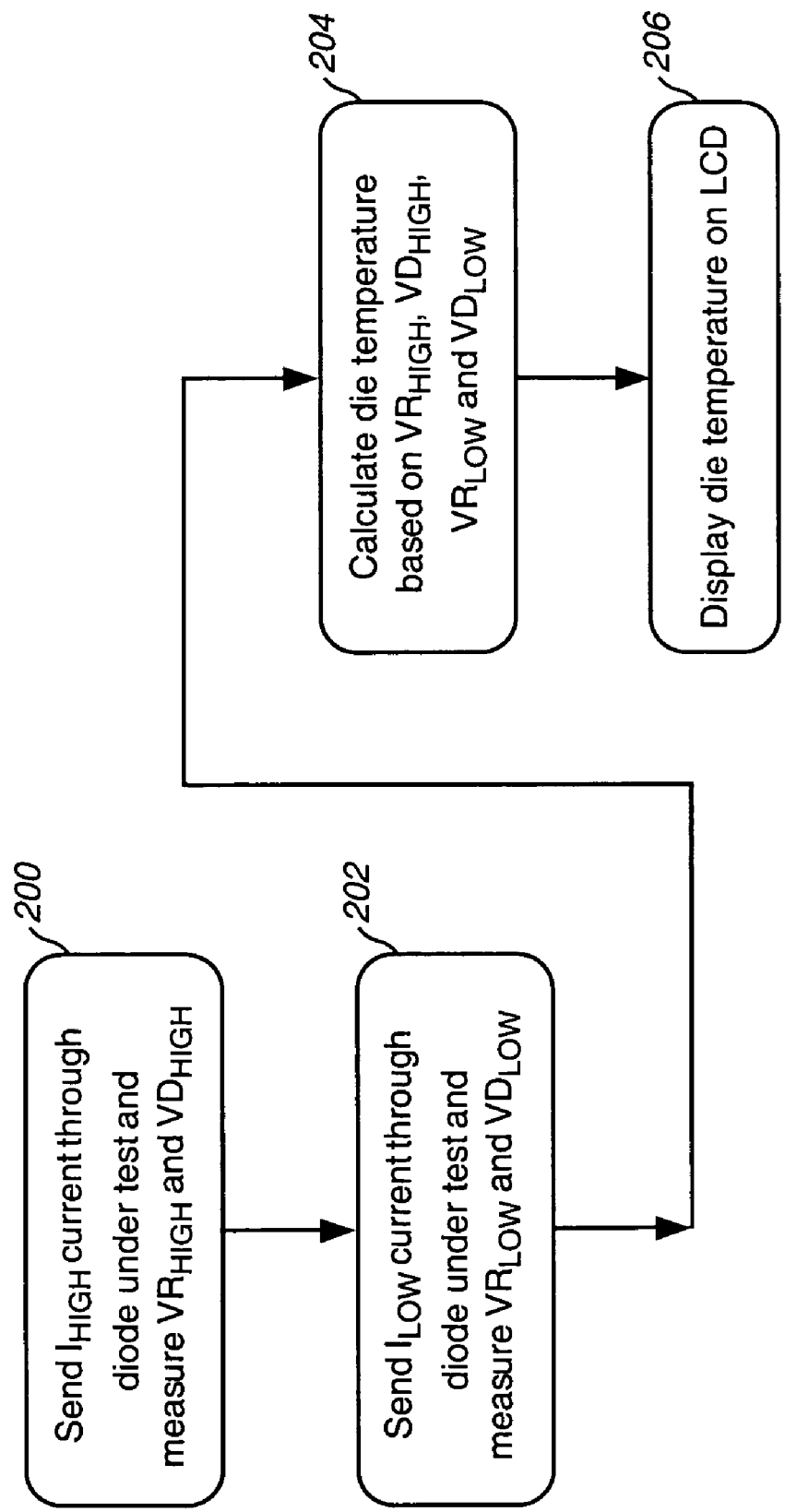
FIG. 3 is a flow chart of the steps used in a method of measuring the temperature of a device in accordance with one embodiment of the invention.

FIG. 3 is a flow chart of the steps used in a method of measuring the temperature of a device in accordance with one embodiment of the invention. The process starts by sending the high current $I_{HIGH}$ through the diode under test and measuring $VR_{HIGH}$ and $VD_{HIGH}$ at step 200. Next the low current $I_{LOW}$ is sent through the diode under test and $VR_{LOW}$ and $VD_{LOW}$ are measured at step 202. The die temperature is calculated using $VR_{HIGH}$, $VD_{HIGH}$, $VR_{LOW}$ and $VD_{LOW}$ at step 204. Finally at step 206 the temperature is displayed.

Thus there has been described a system and method of measuring the temperature of a device that is accurate and does not require additional circuitry since parasitic diodes may always be used. This improves the accuracy and reliability of LFR tests and may be used for other applications.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of measuring the temperature of a device, the method comprising:
   injecting a first current into an on-chip diode of the device, wherein a die containing the on-chip diode is under test;
   injecting a second current into the on-chip diode;
   calculating a junction temperature based on the first current and the second current;
   performing a latent failure rate (LFR) test of the device; and
   based on the calculated junction temperature, adjusting an ambient temperature of the device during the latent failure rate (LFR) test of the device, wherein adjusting the ambient temperature of the device comprises controlling a heater external to the device.

2. The method of claim 1, wherein the injecting the first current further includes:
   selecting an electro-static discharge diode as the on-chip diode.

3. The method of claim 2, wherein the first current is injected through a first resistor.

4. The method of claim 3, wherein the second current is injected through a second resistor.

5. The method of claim 4, wherein a resistance of the first resistor is not equal to a resistance of the second resistor.

6. The method of claim 1, wherein the injecting the first current further includes:
   selecting a parasitic diode as the on-chip diode.

7. A method of measuring the temperature of a device, the method comprising:
   injecting a first current into a first diode on a die under test of the device, wherein the first diode is a part of a circuit of the die under test;
   injecting a second current into a second diode on the die under test;
   calculating a device temperature using the first current and the second current;
   performing a latent failure rate (LFR) test of the device; and
   based on the calculated device temperature, controlling an ambient temperature of the device during the latent failure rate (LFR) test.

8. The method of claim 7, wherein the first current is set higher than the second current.

9. The method of claim 8, wherein the first current passes through a first resistor.

10. The method of claim 9, wherein the second current passes through a second resistor.

11. The method of claim 10, wherein a resistance of the second resistor is greater than a resistance of the first resistor.

12. The method of claim 7, wherein the injecting the first current further includes:
    selecting an electro-static discharge diode as the first diode.

13. The method of claim 7, wherein the injecting the first current further includes:
    selecting a parasitic diode as the second diode.

14. A system, comprising:
    a current source;
    an on-chip diode of a die coupled to the current source, wherein the die containing the on-chip diode is under test;
    a voltage measuring circuit coupled to the on-chip diode;
    a heater coupled with the voltage measuring circuit; and
    a controller coupled with the heater, wherein the controller is configured to calculate a temperature of the die based on a first current and a second current through the on-chip diode and cause the heater to control an ambient temperature of the die during a latent failure rate (LFR) test of the die based on the calculated temperature of the die.

15. The system of claim 14, further including a resistor between the current source and the on-chip diode.

16. The system of claim 15, wherein the on-chip diode is an electro-static discharge diode.

17. The system of claim 14, wherein the current source includes a high current source and a low current source.

18. The system of claim 17, wherein the on-chip diode is a parasitic diode.

* * * * *